Dec. 9, 1941.                  C. W. WADDLE ET AL                 2,265,330
                                 FISHING ROD HOLDER
                               Filed Sept. 23, 1940                 2 Sheets-Sheet 1
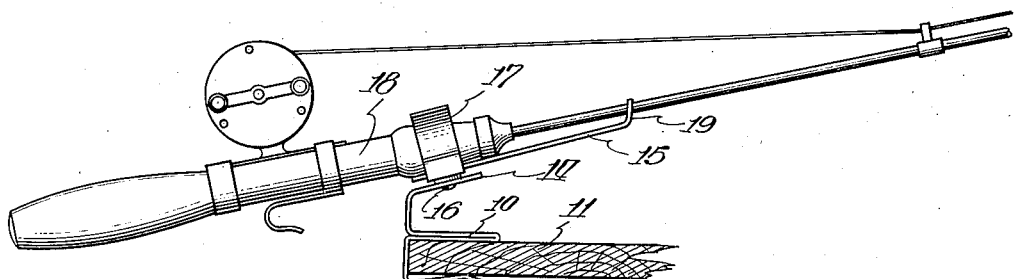
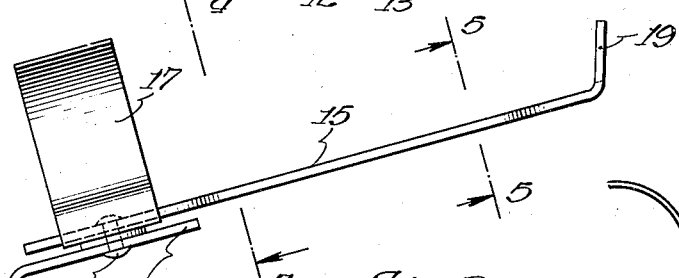
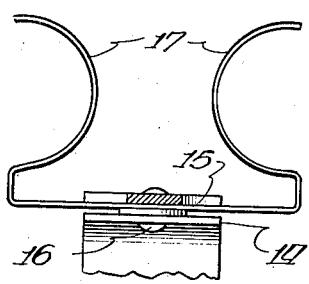
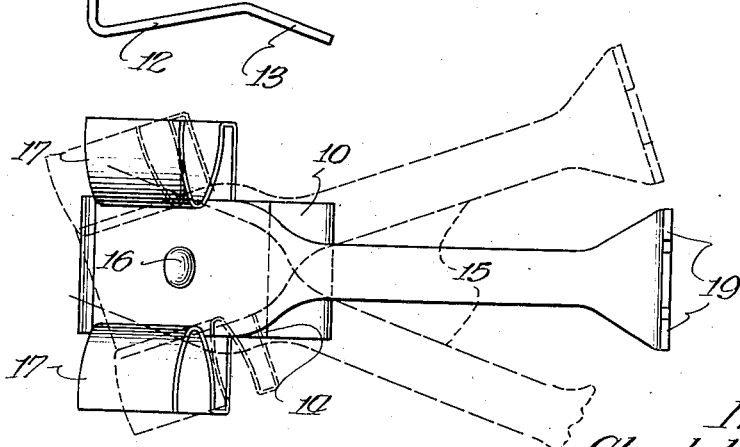
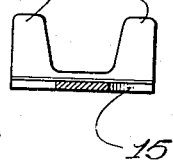
Inventors:
Clark W. Waddle
Merwin C. Waddle
By: Brayton Richards
       Attorney.

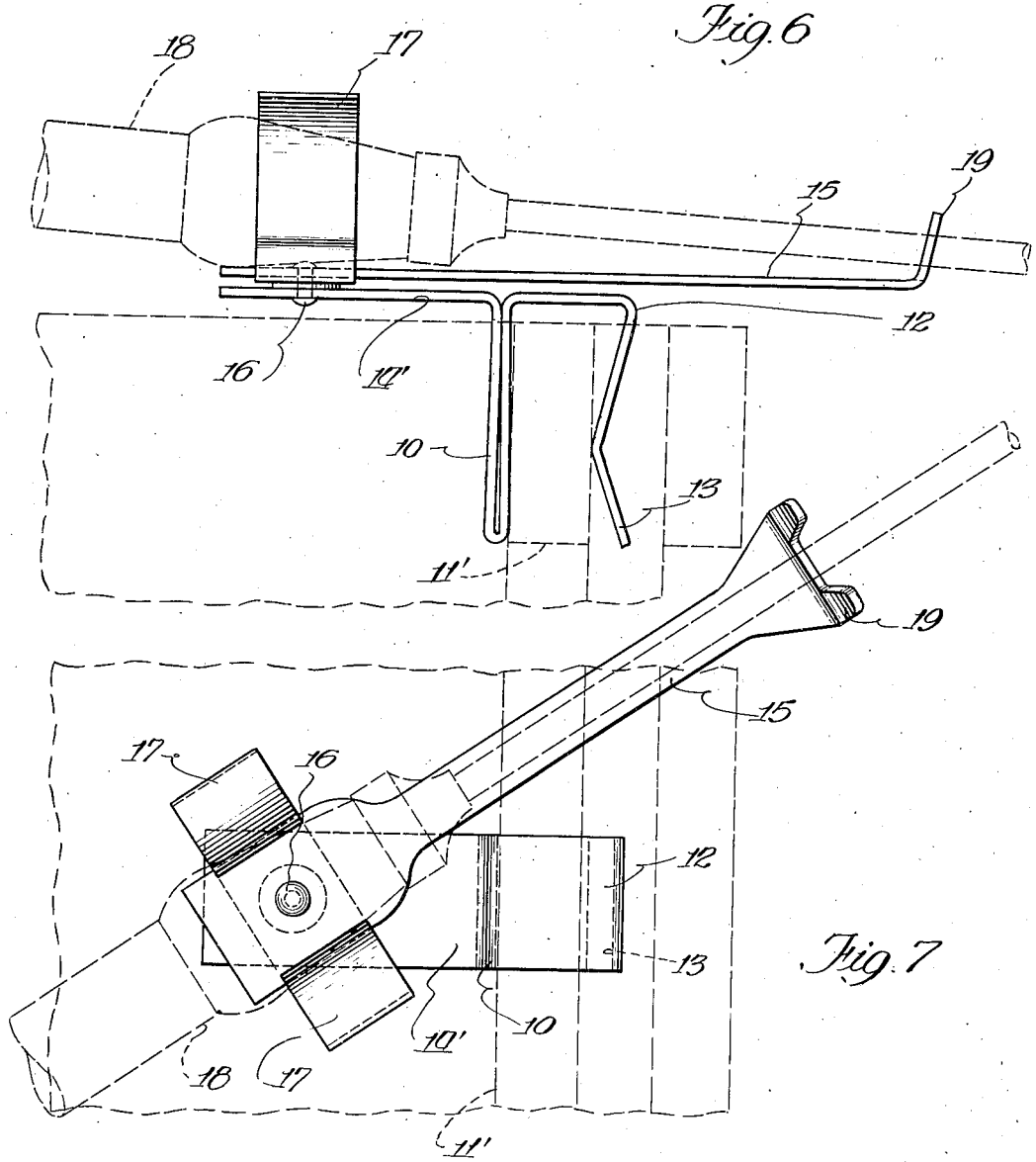

Patented Dec. 9, 1941

2,265,330

UNITED STATES PATENT OFFICE 2,265,330

FISHING ROD HOLDER

Clark W. Waddle, Chicago, and Merwin C. Waddle, Cicero, Ill.

Application September 23, 1940, Serial No. 357,913

3 Claims. (Cl. 248—42)

The invention relates to improvements in fishing rod holders and has for its primary object the provision of an improved construction of the character indicated which is capable of economical production and highly efficient in use.

Other objects will appear hereinafter.

The invention consists of the combinations and arrangements of parts hereinafter described and claimed.

The invention will be best understood by reference to the accompanying drawings forming a part of this specification, and in which Fig. 1 is a side view of a fishing rod holder embodying the invention and shown in position of use;

Fig. 2 an enlarged side view of the holder detached;

Fig. 3 a top plan view of the holder;

Fig. 4 a section taken substantially on line 4—4 of Fig. 2;

Fig. 5 a section taken substantially on line 5—5 of Fig. 2;

Fig. 6 an enlarged view illustrating the modified form of construction and shown in position of use; and Fig. 7 a top plan view of the holder shown in Fig. 6.

The embodiment of the invention illustrated in Figs. 1-5 of the drawings comprises a clamping member formed of a strip of spring steel doubled centrally upon itself to form the upward jaw 10 of a clamp adapted and arranged to engage against the upper side of the forward edge of the rear seat 11 of an ordinary row boat. The lower end of said strip is extended downwardly and then rearwardly to form the cooperating clamping jaw 12 adapted and arranged to cooperate with the jaw 10 to engage said seat as indicated in Fig. 1. The extreme lower end of said strip is flared outwardly at 13 to facilitate engagement with the seat edge as will be readily understood.

The upper end of said strip is extended upwardly and rearwardly to form an upwardly and rearwardly inclined support 14 to which an upwardly and rearwardly inclined supporting bar 15 is pivoted at 16. A rod clamp 17 formed of a strip of spring metal 17 shaped as shown is secured transversely of the bar 15 at its pivot 16 and is adapted and arranged to releaseably engage the handle 18 of an ordinary fishing rod at a point immediately in front of the reel thereon as indicated. At its rear end the supporting bar 15 is turned upwardly at 19 and bifurcated to receive the fishing rod proper as indicated.

By this arrangement a simple and effective rod holder is provided which may be readily engaged over the forward edge of the rear seat of a row boat and will support a fishing rod in proper position and relation for trolling operations and will also permit of the ready attention thereto and removal of the rod from the holder by a person rowing the boat if and when a fish is hooked upon the line as will be readily understood by those skilled in this art. The specific form and arrangements of parts is a simple and effective one for the purpose.

In the modification illustrated in Figs. 6 and 7 the end 14' of the spring metal strip is extended horizontally so as to adapt the device to engage over the inner strip 11' of the gunwale of a row boat and hereby the fishing rod may be extended over the side of the boat as indicated. Otherwise the construction and operation of the modified device is identical with that already described.

While we have illustrated and described the preferred form of construction for carrying our invention into effect, these are capable of variation and modification without departing from the spirit of the invention. We therefore do not wish to be limited to the precise details disclosed but desire to avail ourselves of such variations and modifications as fall within the scope of the appended claims.

We claim:

1. A fishing rod holder comprising a clamping member formed from a strip of spring metal doubled upon itself centrally to form the upper jaw of a seat edge clamp, the lower end of said strip being extended downwardly and bent rearwardly to form a lower clamping jaw to engage the under side of the rear seat edge, the upper end of said strip being bent upwardly and rearwardly to form an upwardly and rearwardly inclined rod support; a supporting bar pivotally connected with said rod support and extending upwardly and rearwardly therefrom, the rearward end of said bar being turned upwardly and bifurcated to receive a rod; and a rod clamp secured transversely to said supporting bar at its pivot and adapted and arranged to releaseably engage the forward end of a rod handle in front of the reel mounting thereof.

2. A fishing rod holder comprising a clamping member formed from a strip of spring metal doubled upon itself centrally to form one jaw of boat part clamp; one end of said strip being extended and bent to form a cooperating clamping jaw substantially parallel to said first mentioned jaw to engage said boat part, the other end of said strip being bent to form a rod support; and a rod clamp on said rod support.

3. A fishing rod holder comprising a clamping member formed from a strip of spring metal doubled upon itself centrally to form one jaw of a boat part clamp; one end of said strip being extended and bent to form a cooperating clamping jaw substantially parallel to said first mentioned jaw to engage said boat part, the other end of said strip being bent to form a rod support; a supporting bar pivotally connected with said rod support having one end turned upwardly and bifurcated to receive a rod; and a spring rod clamp secured transversely to said supporting bar and adapted and arranged to releasably engage a rod handle.

CLARK W. WADDLE.
MERWIN C. WADDLE.